United States Patent
Singh et al.

(10) Patent No.: US 9,177,283 B2
(45) Date of Patent: Nov. 3, 2015

(54) SYSTEM AND METHOD FOR PROVIDING A COMMUNITY PORTAL FOR CHAT-BASED SUPPORT SERVICES

(75) Inventors: Amit Singh, Irving, TX (US); Fariborz Ebrahimi, Arlington, VA (US); Dinyar Kavouspour, Plano, TX (US); Nikhil Goel, Irving, TX (US); Amar Nageswaram, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1640 days.

(21) Appl. No.: 11/771,144

(22) Filed: Jun. 29, 2007

(65) Prior Publication Data

US 2009/0006549 A1  Jan. 1, 2009

(51) Int. Cl.
*G06Q 10/10* (2012.01)
*G06Q 30/00* (2012.01)
*G06Q 30/08* (2012.01)
*G06F 17/30* (2006.01)
*G06Q 30/06* (2012.01)

(52) U.S. Cl.
CPC .......... *G06Q 10/10* (2013.01); *G06F 17/30675* (2013.01); *G06Q 10/101* (2013.01); *G06Q 30/016* (2013.01); *G06Q 30/06* (2013.01); *G06Q 30/08* (2013.01); *Y10S 707/99933* (2013.01)

(58) Field of Classification Search
CPC .. G06Q 30/0613; G06Q 50/01; H04L 12/581; H04L 51/04; H04L 12/1813; H04L 12/1818; H04L 63/104; H04L 67/306; G06F 17/30864; G06F 17/30867; H04N 21/4788; H04N 21/252; H04N 21/25841; H04N 21/44213; H04N 21/44222; H04N 21/4882
USPC ......................................... 709/204
See application file for complete search history.

(56) References Cited

U.S. PATENT DOCUMENTS

| | | | |
|---|---|---|---|
| 6,167,395 A * | 12/2000 | Beck et al. .......................... 1/1 |
| 6,330,243 B1 * | 12/2001 | Strandberg .................... 370/396 |
| 6,345,290 B2 * | 2/2002 | Okada et al. ................. 709/204 |
| 6,377,944 B1 * | 4/2002 | Busey et al. ......................... 1/1 |
| 6,425,012 B1 * | 7/2002 | Trovato et al. ............... 709/227 |
| 6,519,628 B1 * | 2/2003 | Locascio ...................... 709/204 |
| 6,536,037 B1 * | 3/2003 | Guheen et al. ............... 717/151 |
| 6,785,708 B1 * | 8/2004 | Busey et al. ................. 709/204 |
| 6,865,268 B1 * | 3/2005 | Matthews et al. ........ 379/265.09 |
| 6,948,131 B1 * | 9/2005 | Neven et al. ................. 715/753 |
| 7,139,799 B2 * | 11/2006 | Qian et al. ................... 709/205 |
| 7,159,178 B2 * | 1/2007 | Vogt et al. .................... 715/733 |
| 7,328,242 B1 * | 2/2008 | McCarthy et al. ............ 709/204 |
| 7,336,779 B2 * | 2/2008 | Boyer et al. ............ 379/265.02 |
| 7,356,345 B2 * | 4/2008 | Cunningham et al. ........ 455/466 |
| 7,363,246 B1 * | 4/2008 | Van Horn et al. ............... 705/26 |
| 7,685,237 B1 * | 3/2010 | Weaver et al. ................ 709/205 |
| 2001/0056359 A1 * | 12/2001 | Abreu ................................ 705/3 |
| 2002/0059098 A1 * | 5/2002 | Sazawa et al. .................. 705/14 |
| 2003/0050857 A1 * | 3/2003 | Shaftel ............................ 705/26 |
| 2003/0093480 A1 * | 5/2003 | Lagarde et al. ............... 709/206 |
| 2003/0187672 A1 * | 10/2003 | Gibson et al. ..................... 705/1 |
| 2004/0111479 A1 * | 6/2004 | Borden et al. ................ 709/206 |
| 2004/0117444 A1 * | 6/2004 | Goodman et al. ............ 709/204 |
| 2004/0152477 A1 * | 8/2004 | Wu et al. ....................... 455/466 |
| 2004/0260770 A1 * | 12/2004 | Medlin et al. ................ 709/204 |

(Continued)

*Primary Examiner* — Backhean Tiv

(57) ABSTRACT

An approach is disclosed for providing a community portal for chat-based support services. Chat sessions corresponding to customer support service are established among multiple users and one or more agents. A community of the users is created during the chat sessions.

22 Claims, 7 Drawing Sheets

(56) References Cited

U.S. PATENT DOCUMENTS

| | | | |
|---|---|---|---|
| 2005/0119963 A1* | 6/2005 | Ko | 705/37 |
| 2005/0198124 A1* | 9/2005 | McCarthy | 709/203 |
| 2005/0234727 A1* | 10/2005 | Chiu | 704/270.1 |
| 2006/0020521 A1* | 1/2006 | Todd | 705/26 |
| 2006/0136474 A1* | 6/2006 | Chang et al. | 707/102 |
| 2006/0235969 A1* | 10/2006 | Dugan | 709/225 |
| 2006/0253365 A1* | 11/2006 | Langshur et al. | 705/37 |
| 2006/0271953 A1* | 11/2006 | Jacoby et al. | 725/34 |
| 2007/0136400 A1* | 6/2007 | Ames et al. | 707/205 |
| 2007/0201378 A1* | 8/2007 | Tarkiainen et al. | 370/252 |
| 2007/0208719 A1* | 9/2007 | Tran | 707/3 |
| 2007/0219794 A1* | 9/2007 | Park et al. | 704/246 |
| 2007/0219863 A1* | 9/2007 | Park et al. | 705/14 |
| 2008/0027820 A1* | 1/2008 | Brill | 705/26 |
| 2008/0040427 A1* | 2/2008 | Shroff et al. | 709/204 |
| 2008/0077956 A1* | 3/2008 | Morrison et al. | 725/38 |
| 2008/0189623 A1* | 8/2008 | Patil | 715/753 |
| 2008/0307220 A1* | 12/2008 | Campbell | 713/155 |
| 2010/0114702 A1* | 5/2010 | Wu et al. | 705/14.53 |
| 2013/0159527 A1* | 6/2013 | Roach | 709/225 |

* cited by examiner

SYSTEM AND METHOD FOR PROVIDING A COMMUNITY PORTAL FOR CHAT-BASED SUPPORT SERVICES

BACKGROUND INFORMATION

Providing high quality service to customers has become a primary consideration by organizations and companies, such as those in the telecommunications, manufacturing, finance, as well as other service oriented businesses that are seeking to gain a competitive edge in their respective markets. To this end, companies in these sectors spend significant amounts of money to provide a high level of customer service. For example, enormous investments have been made to establish call centers for handling customer inquiries. Traditionally, companies have relied on telephony services to address the customers' needs, e.g., provisioning toll-free customer service telephone numbers for call centers, so that customers can reach their service representatives without incurring cost. However, it is recognized that the convergence of traditional telephony communications and data communications has enabled other cost-effective means for reaching out to customers. For example, with the increasing popularity of chat (i.e., instant messaging (IM)) applications, organizations have started to consider chat-based customer service. However, even though the messaging may be "instant," the processing time for a service representative to address the customer's problem or inquiry remains somewhat unchanged from that traditional telephony call center model. Consequently, customer satisfaction may be negatively impacted if this processing period is significant. Furthermore, with traditional chat-based systems, the customer service representative has very little control over the user experience of the customer.

Based on the foregoing, there is a clear need for an efficient approach to provide support services over a chat-based system, while enhancing user experience.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION OF PREFERRED EMBODIMENTS

An apparatus, method, and software for providing a community portal for chat-based support sessions are described. In the following description, for the purposes of explanation, numerous specific details are set forth in order to provide a thorough understanding of the various exemplary embodiments. It is apparent, however, to one skilled in the art that the various exemplary embodiments may be practiced without these specific details or with an equivalent arrangement. In other instances, well-known structures and devices are shown in block diagram form in order to avoid unnecessarily obscuring the exemplary embodiments.

Although the various embodiments are described with respect to chat or instant messaging applications, it is contemplated that these embodiments have applicability to other equivalent applications.

Figure 1:
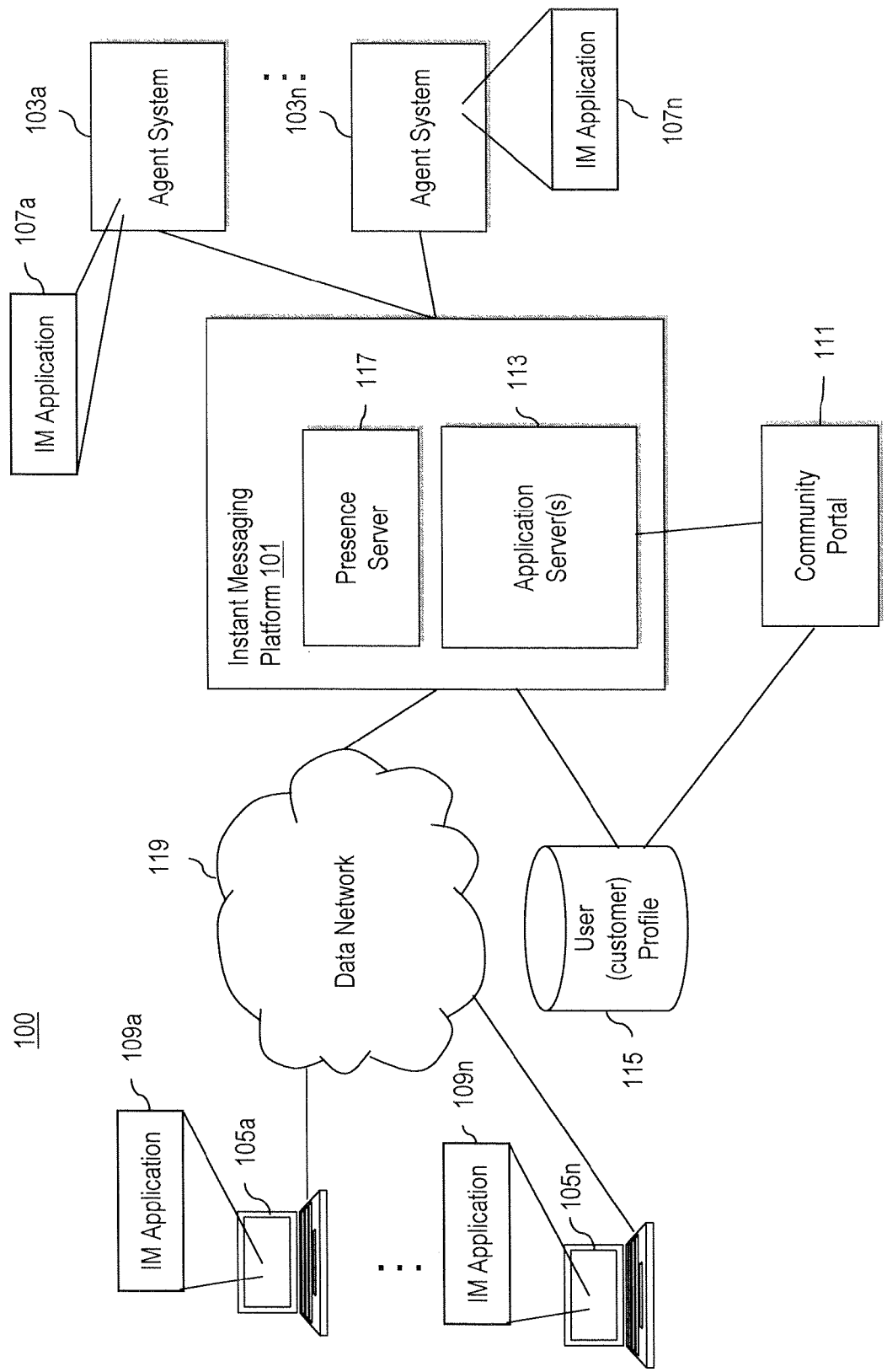
FIG. 1 is a diagram of a communication system including a community portal for providing instant messaging (or chat)-based support service, according to various exemplary embodiments.

FIG. 1 is a diagram of a communication system including a community portal for providing instant messaging (or chat)-based support service, according to various exemplary embodiments. A communication system 100 includes an instant messaging (IM) (or instant communication) platform 101 that facilitates establishment of instant messaging, or chat, sessions among users and agents. For the purposes of illustration, the system 100 is described with respect to deployment within a service provider or organization that employs one or more agents utilizing agent systems 103a-103n to assist users (e.g., customers) via computing devices 105a-105n with services and products offered by the service provider. The IM platform 101 enables an agent to form a list of users that they are serving, and process messages, such as text messages, between endpoints. In an exemplary embodiment, the agents possess the capability to control and manage the chat interface experienced by the users. The computing devices 105a-105n can include desktop personal computers, workstations, web appliances, personal digital assistants (PDAs), palm computers, etc. The agent is, for instance, a customer service representative who can provide such services as provisioning, trouble-ticket handling, technical support, accounting, etc., to one or more users. As shown, each of the agent systems 103a-103n, according to one embodiment, executes instant messaging (IM) applications (or clients) 107a-107, respectively. Likewise, the computing devices 105a-105n are loaded with IM applications 109a-109n to communicate with the agent systems 103a-103n.

Chat-based customer support is appealing to both customers and businesses alike, as providing chat-based services is less costly compared to telephone based customer service, and customers may find that this alternative form of communication to be more effective—i.e., the customer can access a customer service representative more quickly than the case with telephone based support. The chat-based system merits these advantages due to the multi-session handling ability of customer support agents, whereas with telephone based support, the customer support representative can handle only one customer at a time. Hence, chat systems are more efficient.

On average, customers typically spend about 10 minutes on chat with a representative; however, not all this time is spent in continuous interaction with a representative. There may be intermittent periods of time in which the representative needs to spend time on tasks and activities addressing the customer's inquiry (or simply time associated with typing). Consequently, the customer is relatively idle on the computer.

To enhance the user experience, the system 100 utilizes a community portal 111 for creating a community and marketplace of the users for these users to share information (and conduct business transactions) during the idle periods of the chat sessions. For example, while the customers are waiting for a response, the users within the community can conduct trade and/or auctions among the community users, according to one embodiment. Also, a user can link postings from other marketplaces and portals the user is a part of. This channel may also provide an efficient way for the service provider to market its products and services. The community portal 111, thus, interfaces with one or more application servers 113 to enable these applications. The application server 113 communicates, for certain applications, with a user (customer) profile database 115. By way of example, the customer profile database 115 can include data such as customer name, address, profile, location, interests, subscriptions, etc. Exemplary applications are described with respect to FIG. 3. In one embodiment, the community portal 111 is deployed as a website of the service provider.

As seen, the IM platform 101 also includes a presence server 117 to determine which users and agents are online. Because of the immediate or instant nature of the communication, instant messaging service requires presence information or availability of the users. The computing devices 105a-105n send presence information (e.g., presence messages) over a data network 119 to the presence server 117 to indicate state of the devices 105a-105n. The data network 119 can include the global Internet. The agent systems 103a-103n also transmit presence information to indicate their availability to conduct chat sessions. This presence information is updated periodically. Additionally, the presence server 117 can track whether a sufficient number of users are available to have a viable community; this number is configurable by the agent.

In one embodiment, the community portal 111 also provides access to one or more external communities (not shown) as well as external portals. These communities are external in a sense that they are not controlled by the service provider, and thus, is not a part of the service provider's communication system.

Communities are created by the community portal 111, as next described.

Figure 2:
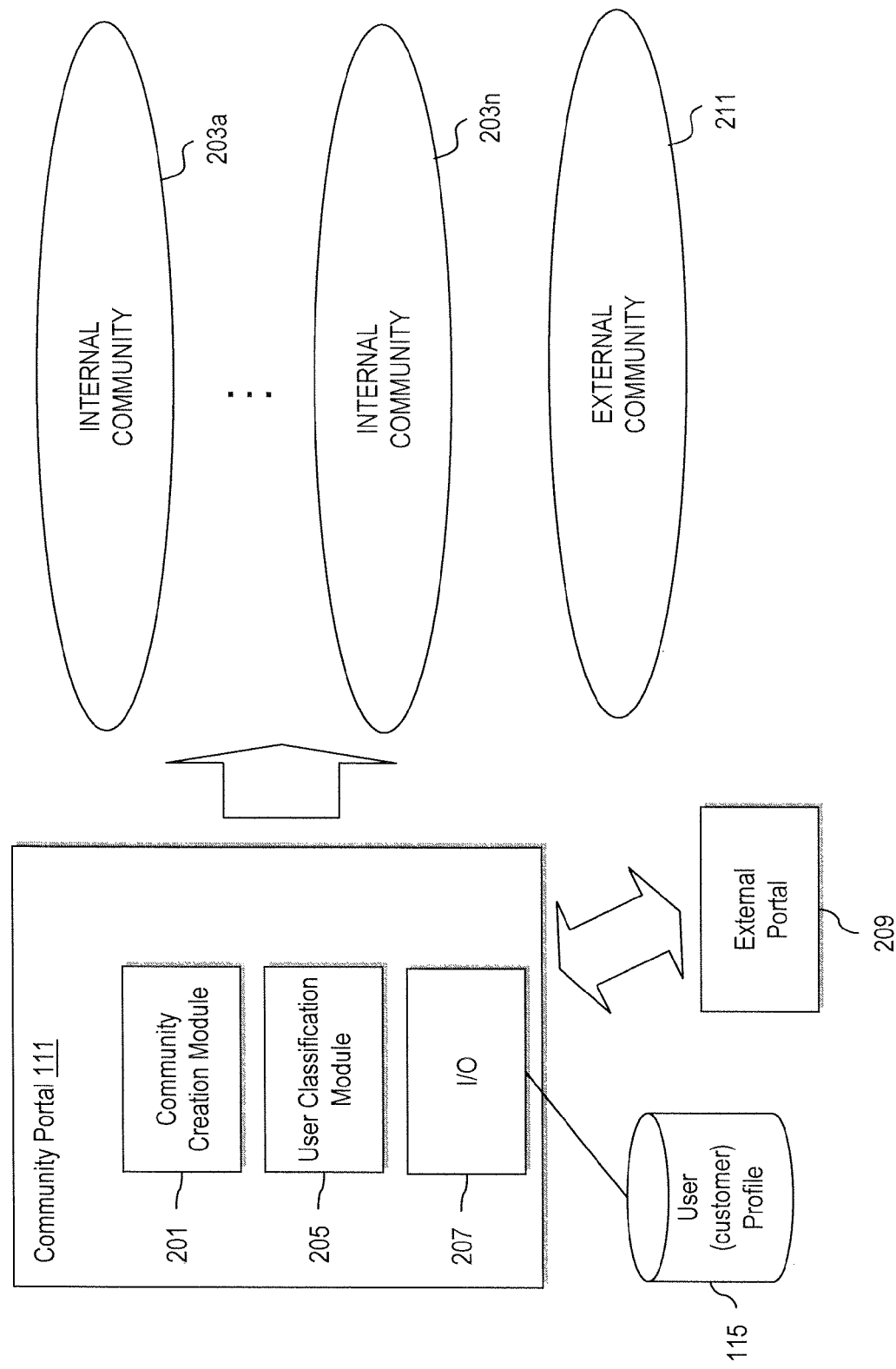
FIG. 2 is a diagram of a community portal capable of establish a community of users involved in chat sessions for receiving support services from an agent, according to an exemplary embodiment.

FIG. 2 is a diagram of a community portal capable of establish a community of users involved in chat sessions for receiving support services from an agent, according to an exemplary embodiment. In this example, the community portal 111 includes a community creation module 201 for creating one or more internal (local) communities—i.e., internal in a sense that the communities include only customers of the service provider. If multiple communities 203a-203n are defined, then a user classification module 205 is invoked to determine an appropriate community a new user belongs. Additionally, the portal 111 includes an input/output (I/O) interface 207 for retrieving data from the user profile database 115. Further, as mentioned, the community portal 111 can provide links to an external portal 209 as well as an external community 211.

It is recognized that user generated content, either through blogging, or by the creation of user communities has been a key driver in the ubiquitous adoption of discussion groups in ever sprawling social networks (e.g., Wikipedia™, Yahoo® Answers, etc.) There are numerous other websites on the Internet that thrive on the wealth of information possessed by users of the community. Traditionally, user-generated content has been used mainly to convey user opinions.

The main challenge with many of these websites and communities involves attracting a large number of users such that a significant and useful amount of content can be generated by these users. Large companies, with their massive customer bases, have the inherent characteristic of a large audience for their websites. Unfortunately, websites do not address specific customer issues, thus regulating use of these websites for retrieval of very general information, contact information for a customer service representative, new offers, or generic account data. Websites, therefore, are not suitable for promoting user communities for sharing content and creating a marketing place for the company.

As noted, with the growing interest and popularity of chat-based customer service, customers can spend significant time on the company website waiting for an agent to respond as agents can serve multiple customers at the same time. Thus, to increase the productivity or otherwise enhance the experience of the user, user communities can be established on the customer support websites.

The local communities 203a-203n, in an exemplary embodiment, can be tailored based on the profile of the customers. The profile can include such exemplary parameters as demographics, place of residence, services that the customer subscribes to, etc. For potential customers, the local communities 203a-203n can be displayed as a list based on the most popular or most number of posts per category.

According to one embodiment, these online communities can be classified as either passive or active communities. In the passive communities, a user can post a question in the community room and other users can post the response in a non-real time manner. Active communities, on the other hand, are similar to chat rooms, in which the online users in a particular community are in one single chat room. Active communities can provide rapid results to a customer question/inquiry. With passive communities, a customer might have to wait for an appropriate answer, but can acquire views from a large number of users. Furthermore, online communities may be enhanced by company representatives if they monitor traffic and postings on these communities and respond to those questions that have not yet been answered.

Figure 3:
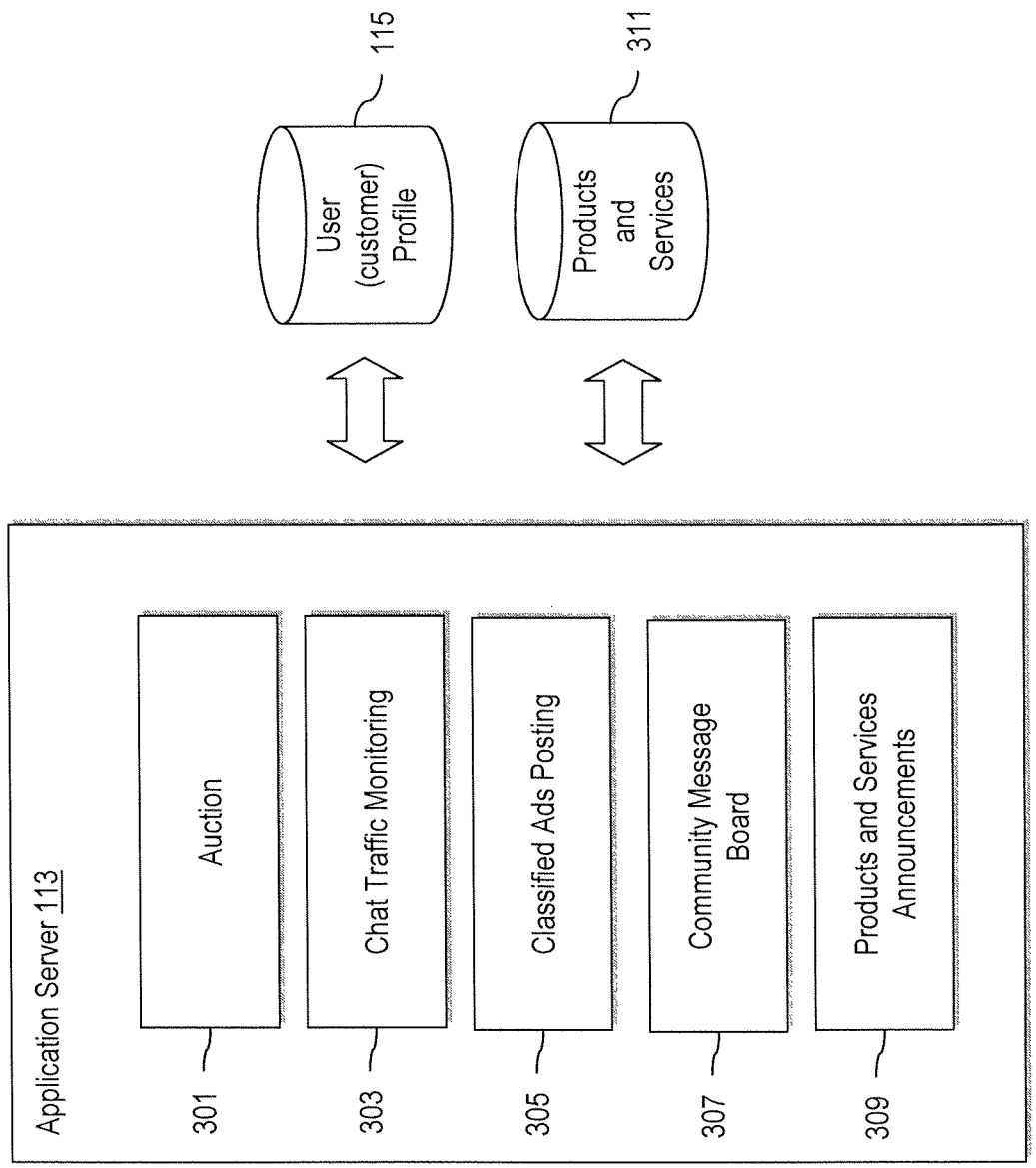
FIG. 3 is a diagram of an application server capable of providing applications for a community of users, according to an exemplary embodiment.

In addition to message postings, the customers within the communities are provided with a variety of other applications, as described in FIG. 3.

FIG. 3 is a diagram of an application server capable of providing applications for a community of users, according to an exemplary embodiment. By way of example, the application server 113 in the system 100 includes the following applications: auction 301, chat traffic monitoring 303, classified ads posting 305, community message board 307, and products and services announcements 309. The auction application 301 enables users within the community to participate in the auctioning of items that the users have to offer. The chat traffic monitoring application 303 monitors chat messages, which can engender trust among the users. For instance, the communities can be monitored by company representatives, and these representatives can ensure that the information on the site is correct and accurate. This can instill a sense of trust with the customers by providing them with accurate and up-to-date information. Additionally, this sense of trust can elevate the image of the company.

In addition, with the classified ads posting application 305, the users can simply post classified ads about any item they wish to sell or buy. Once the community is established, the user can also post reviews and commentary using the community message board application 307. As another application, the users can receive information about current products and services of the service provider or third party vendors via the products and services announcements application 309, which accesses product and services information from database 311. Through this application 309, promotions and new information can be disseminated more quickly from the company's site rather than through third party sites, thereby potentially increasing the revenue potential for the company. Furthermore, since customer records are stored in the company's database 311, communities can be tailored based on the profiles of customers and their demographics, resulting in more tailored and targeted communities.

The information exchanged among the users can also be used by companies to examine which product or service is receiving unfavorable reviews. Companies can then work on those areas proactively in changing customer perception as well as enhancing the deficient product. These types of communities can assist with conducting user acceptance testing; thus, companies can get valuable feedback with nominal additional cost.

Another revenue generating feature of the online communities involves advertisements. Companies may negotiate with third parties, such as advertising agencies etc., for disseminating advertisements to these communities. For example, advertisements (in form of the products and services announcements) placed on these domain specific sites have the potential to be viewed by a highly targeted audience. This results in an effective revenue generation mechanism for the service provider.

In addition to the many benefits that can be gained by the service provider, the community portal 111 can confer a number of benefits to the customers as well. For instance, a customer waiting for a response from a customer service representative engaged in a chat session may post his/her questions, via the message board application 307, in one of the communities. This question may then be answered in real time by one or more users of the community. Alternatively, the user may search for the answers within the postings of the various communities to more quickly obtain answer(s) to a question. It is also contemplated that users interested in buying a specific product or service can find recommendations or comments from other users in the community.

Figure 4:
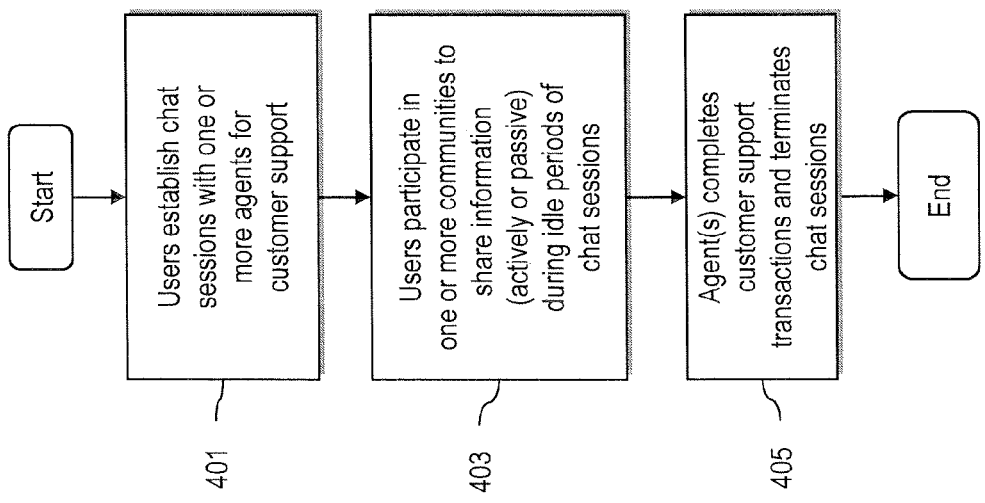
FIG. 4 is a flowchart of a chat-based support process, according to an exemplary embodiment.

FIG. 4 is a flowchart of a chat-based support process, according to an exemplary embodiment. For explanatory purposes, in this example, the term "user" (e.g., customer) and "agent" refer to the corresponding devices or system that enables them to participate in a chat session. In step 401, the users 105a-105n initiate support sessions with one or more of the agents 103a-103n. It is noted that a single agent 103a can accommodate multiple customers.

Next, in step 403, the users 105a-105n can participate in one or more communities to share information (actively or passively) during idle periods of the chat sessions.

During the chat session, the agent 103a poses various questions to the customer (e.g., user 105a) as part of the support process in resolving the customer's inquiry or need. The responses from the customer 105a are then collected to resolve the customer's inquiry. Once the support session or transaction is completed, the chat session is terminated, per step 405. Until such termination, the customer 105a can participate in the communities; alternatively, the customer 105a can elect to continue to participate after the support chat session has ended.

Figure 5:
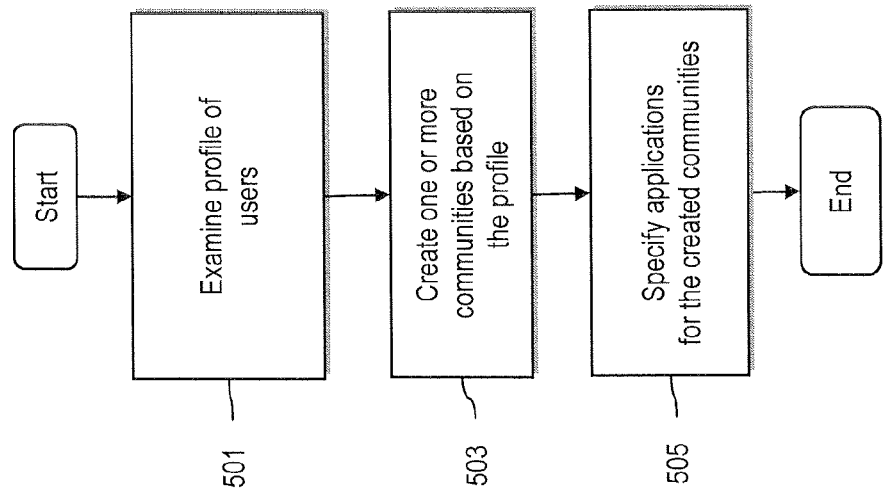
FIG. 5 is a flowchart of a process for establishing communities for participation by users engaged in chat-based support sessions, according to an exemplary embodiment.

FIG. 5 is a flowchart of a process for establishing communities for participation by users engaged in chat-based support sessions, according to an exemplary embodiment. As previously mentioned, the communities can be established by the community portal 111 based on the profile of the users (steps 501 and 503). It is noted that the communities can be predetermined based on historical data, for instance. Alternatively, the creation can by performed dynamically by the community creation module 201. The set up of the communities can be tied to the applications; in other words, the nature and purpose of the communities can suggest the type of applications that are to be supported (step 505).

Figures 6, 7:
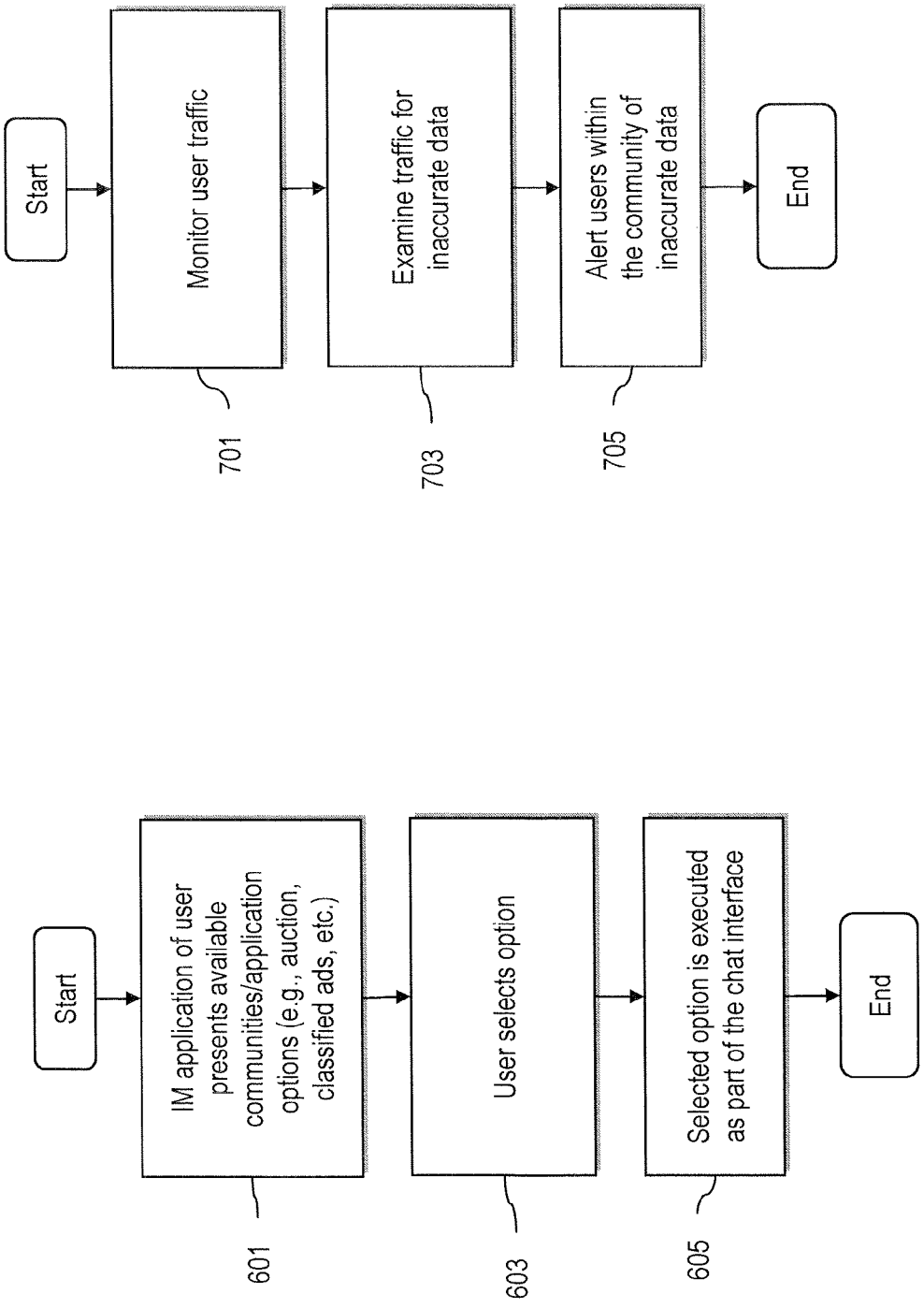
FIG. 6 is a flowchart of a chat-based support process, according to an exemplary embodiment.
FIG. 7 is a flowchart of a process for monitoring community traffic associated with chat-based support sessions, according to an exemplary embodiment.

FIG. 6 is a flowchart of a chat-based support process, according to an exemplary embodiment. Under this scenario, the IM application (e.g., 109a) of the user 105a, for example, presents the available communities and/or applications, per step 601. During the support chat session, the user 105a can select a particular option, as in step 603. In step 605, the selected option is then executed by the IM application 109a.

FIG. 7 is a flowchart of a process for monitoring community traffic associated with chat-based support sessions, according to an exemplary embodiment. This capability involves the chat traffic monitoring application 303, whereby the user traffic is monitored and analyzed (steps 701 and 703). For example, if a user shared inaccurate information with other users, the service provider has the capability to intercede and state the correct information, as in step 705.

Figure 8:
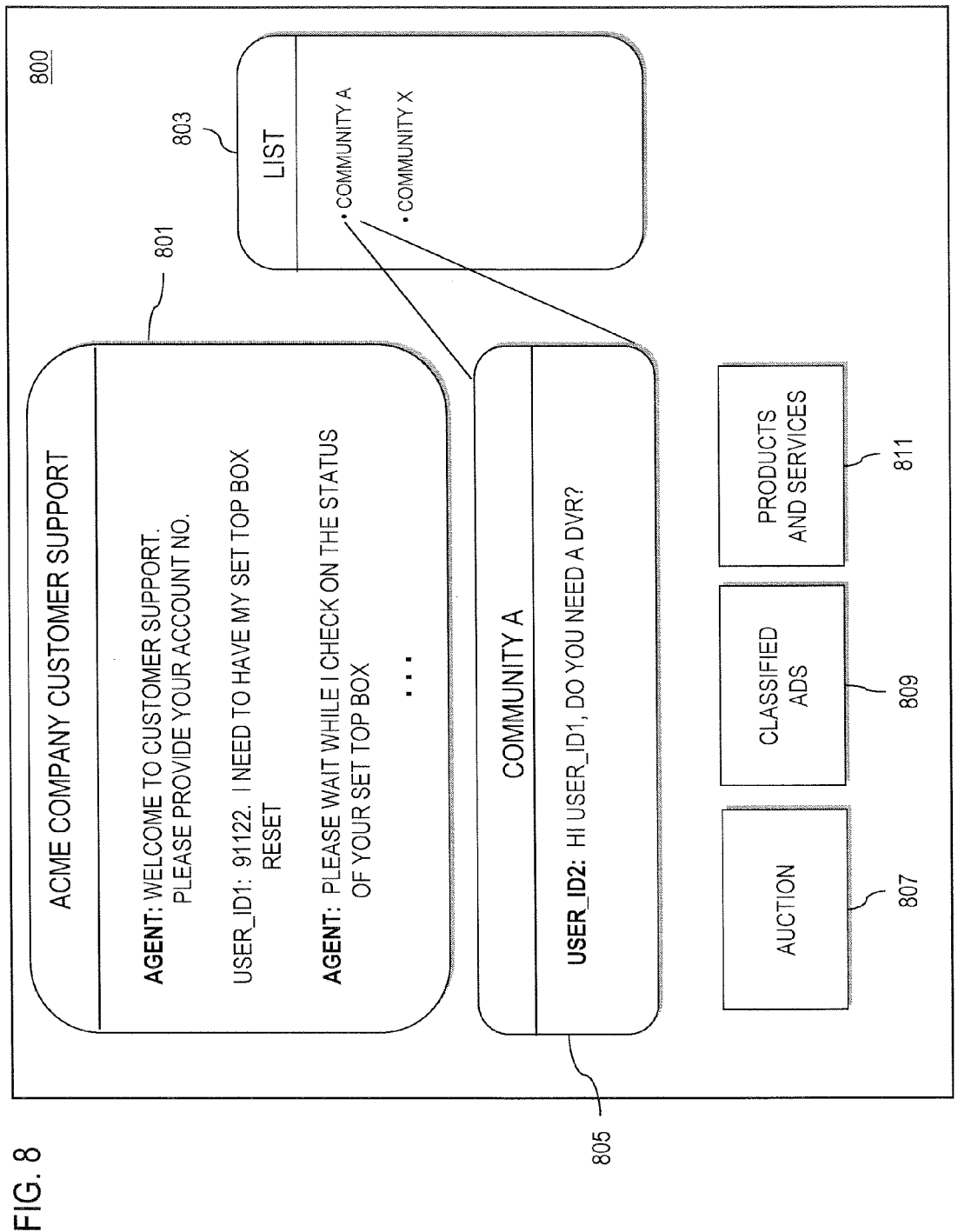
FIG. 8 is a diagram of a graphical user interface (GUI) providing a chat interface, according to an exemplary embodiment.

FIG. 8 is a diagram of a graphical user interface (GUI) providing a chat interface, according to an exemplary embodiment. In this example, an exemplary GUI 800 is provided by the IM application 109a for the customer 105a. It is assumed that the IM application 109a has established a chat session between the customer 105a and the agent 103a. Hence, a text box 801 contains a text dialogue between the agent 103a and the customer 105a. For instance, the customer 105a, who is a subscriber to a television service, has a concern about a malfunctioning set top box. The agent 103a initiates the chat session with an introductory phrase: "Welcome to customer support. Please provide your account number." In response, the customer 105a supplies an account number, and at this time, states the reason for the service "call." Alternatively, any identifier can be use to uniquely identify the user. Under this scenario, the customer 105a is somewhat knowledgeable about the technical malfunction, and requests that the set top box be reset. Thereafter, the agent 103a can retrieve the profile of the customer 105a and perform the necessary activities for servicing the set top box. The agent 103a can alert the customer 105a that there will be a wait period, by stating "Please wait while I check on the status of your set top box." During this idle period, the customer 105a can interact with one or more communities.

Accordingly, a list 803 of communities (e.g., Community A and Community X) is provided as part of the interface 800. Under this scenario, Community A represents a local community, while Community X is an external one. By way of example, the customer 105a selects Community A, thereby launching a text box 805; as an active community, the customer 105a immediately receives a proposition from another user (e.g., customer 105n), who inquires whether the customer 105a needs a DVR (digital video recorder). The community portal 111 presents Community A to the customer 105a because, for example, the nature of the support session involves a set top box. Accordingly, the community portal 111 notes that such products are of interest to the customer 105a. Additionally, the user profile of the customer 105a may dictate a community tailored to television services.

In this example, the Community A support the applications of auctioning, classified ads, and products and services announcements, as indicated by presence of an auction button 807, a classified ads button 809, and a products and services button 811. Had the customer 105a selected Community X, perhaps only the option for products and services announcements is viable. The products and services button 811, in an exemplary embodiment, can be in form of a banner.

Because online communities are generally available around the clock, whereas customer support operations are usually available for 10-12 hours a day, the described approach enables customers 105a-105n to seek and acquire answers anytime of the day with relative ease. This also helps to solve a critical work management problem, whereby the agents 103a-103n can login to these communities when the chat volume is low and at the same time respond to multiple customers. Moreover, the user remains productive during the idle periods of a customer support session.

The above described processes relating to managing, by an agent, a chat interface and associated processes for customer support may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
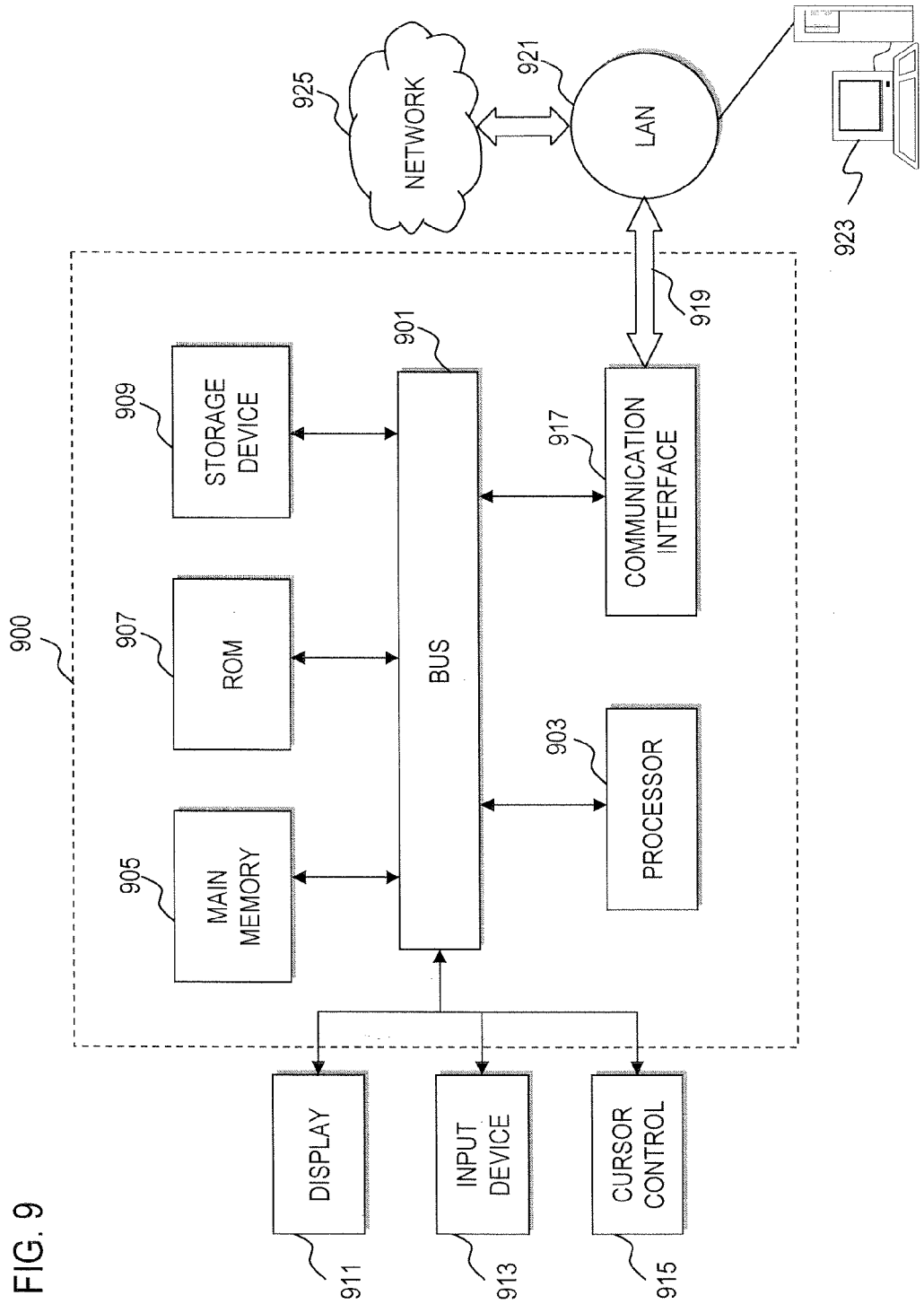
FIG. 9 is a diagram of a computer system that can be used to implement various exemplary embodiments.

FIG. 9 illustrates a computer system 900 upon which an exemplary embodiment can be implemented. For example, the processes described herein can be implemented using the computer system 900. The computer system 900 includes a bus 901 or other communication mechanism for communicating information and a processor 903 coupled to the bus 901 for processing information. The computer system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is a cursor control 915, such as a mouse, a trackball, or cursor direction keys, for communicating direction information and command selections to the processor 903 and for controlling cursor movement on the display 911.

According to one embodiment of the invention, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the exemplary embodiment. Thus, exemplary embodiments are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g. for Ethernet™ or an Asynchronous Transfer Model (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an exemplary embodiment through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the various exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

What is claimed is:

1. A method comprising:
    establishing, by an apparatus, a plurality of chat sessions corresponding to customer support service among a plurality of users and one or more agents of a service provider;
    retrieving, by the apparatus, profiles of the plurality of users;
    dynamically including in a community, by the apparatus, one or more of the plurality of users that are participating in at least one of the plurality of chat sessions, based on a context of customer support inquiries raised in the chat sessions and the profiles of the plurality of users;
    determining one or more applications specifically provided for the community, wherein the one or more applications are enabled and available for the users when waiting for the agents during the chat sessions, and the one or more applications include a message board application displaying in a graphical user interface postings of at least the customer support inquiries during the chat sessions;
    in response to the waiting for the agents during the chat sessions, selecting a list of communities by the apparatus based on the context of customer support inquiries and the profiles of the plurality of users, and initiating a display of the list of communities on the graphical user interface, wherein the list of communities includes the community and at least one external community over which the service provider has no control;
    linking to the postings, during the chat sessions, one or more other postings from the list of communities and applications the one or more users are associated with;
    determining one or more answers within the postings in response to a search query by the one or more users during the chat sessions; and
    providing in the graphical user interface an on-line auction service for the list of communities via the message board application during the chat sessions.

2. A method according to claim 1, wherein the plurality of users in the community share information using respective chat interfaces of the plurality of users, the method further comprising:
    monitoring the shared information; and
    when determining inaccurate information is shared, interceding the inaccurate information during the chat sessions,
    wherein the on-line auction service is provided in the graphical user interface in a form of a banner.

3. A method according to claim 2, wherein the shared information relates to classified advertisements of the plurality of users, and the shared information is inaccurate because the shared information is out-of-date.

4. A method according to claim 1, further comprising:
    distributing service and product information to the plurality of users during the chat sessions, wherein the service and production information is associated with either the service provider or a third party.

5. A method according to claim 1, further comprising:
    classifying by the apparatus that the one or more of the users belong to the community; and
    initiating display on the graphical user interface the message board application and information of the created community to each of the one or more of the plurality of users that are still participating in at least one of the plurality of chat sessions;
    in response to a user selection of the community, initiating display on the graphical user interface at least one chat session between one of the users waiting for at least one of the agents and another user of the community.

6. A method according to claim 1, the method further comprising:
    monitoring traffic exchanged among the plurality of users of the community; and
    tracking whether a predetermined number of users are active to keep the community viable.

7. A method according to claim 1, the method further comprising:
    linking one of the plurality of users via the customer support service to either the at least one external community or an external portal over which the service provider has no control; and
    in response to a user selection of the at least one external community, initiating display on the graphical user interface at least one chat session between one of the users waiting for at least one of the agents and a user of the at least one external community.

8. A system comprising:
    an instant message platform including a processor and being configured to support a plurality of chat sessions corresponding to customer support service among a plurality of users and one or more agents of a service provider, wherein the processor is further configured to retrieve profiles of the plurality of users; and
    a community portal, executed on a computing system, configured to:
    communicate with the instant message platform and to dynamically include in a community of one or more of the plurality of users that are participating in at least one of the plurality of chat sessions, based on a context of customer support inquiries raised in the chat sessions and the profiles of the plurality of users, determine one or more applications specifically provided for the community, the one or more applications are enabled and available for the users when waiting for the agents during the chat sessions, and the one or more applications include a message board application displaying in a graphical user interface postings of at least the customer support inquiries during the chat sessions, in response to the waiting for the agents during the chat sessions, select a list of communities based on the context of customer support inquiries and the profiles of the plurality of users, initiate a display of the list of communities on the graphical user interface, wherein the list of communities includes the community and at least one external community over which the service provider has no control, link to the postings, during the chat sessions, one or more other postings from the list of communities and applications the one or more users are associated with, determine one or more answers within the postings in response to a search query by the one or more users during the chat sessions, and provide in the graphical user interface an on-line auction service for the list of communities via the message board application during the chat sessions.

9. A system according to claim 8, wherein the plurality of users in the community share information using respective chat interfaces of the plurality of users.

10. A system according to claim 9, wherein the shared information relates to classified advertisements of the plurality of users.

11. A system according to claim 8, wherein service and product information is distributed to the plurality of users, and the service and production information is associated with either the service provider or a third party.

12. A system according to claim 8, wherein the processor is further configured to initiate display on the graphical user interface the message board application and information of the created community to each of the one or more of the plurality of users that are still participating in at least one of the plurality of chat sessions.

13. A system according to claim 8, further comprising:
an application configured to monitor traffic exchanged among the plurality of users of the community.

14. A system according to claim 8, wherein one of the plurality of users is linked to either an external community or an external portal.

15. A method comprising:
establishing, by a user apparatus, a chat session for customer support service to an agent, wherein the user apparatus is among a plurality of user apparatus receiving customer support service via a plurality of chat sessions with one or more agents of a service provider;

transmitting, by the user apparatus, a user profile to a server to dynamically include in one or more communities that one or more of the plurality of user apparatus based upon corresponding user profiles and a context of customer support inquiries raised in the chat sessions;

selecting, by the user apparatus, an option to participate in the one or more communities of the plurality of user apparatus that are participating in at least one of the plurality of chat sessions;

displaying, by the user apparatus, representation of one or more applications specifically provided for the one or more communities, the one or more applications are enabled and available for the users when waiting for the agents during the chat sessions, and the one or more applications include a message board application displaying in a graphical user interface of the user apparatus postings of at least the customer support inquiries during the chat sessions;

during the waiting for the agents during the chat sessions, initiating displaying on the graphical user interface a list of communities selected based on the context of customer support inquiries and the profiles of the plurality of users, wherein the list of communities includes the community and at least one external community over which the service provider has no control;

in response to a search query transmitted during the chat sessions, receiving via the graphical user interface one or more answers determined within the postings; and receiving via the message board application in the graphical user interface an on-line auction service for the list of communities during the chat sessions.

16. A method according to claim 15, further comprising either:
sharing information, by the user apparatus, with other user apparatus of the one or more communities, wherein the shared information includes a classified advertisement of the user apparatus;
or
receiving service and product information, wherein the service and production information is associated with either the service provider or a third party.

17. A method according to claim 15, further comprising: displaying on the graphical user interface the message board application and information of the created one or more communities at the user apparatus that is still participating in at least one of the plurality of chat sessions.

18. A method according to claim 15, wherein traffic exchanged among the plurality of user apparatus of the one or more communities is monitored.

19. An apparatus comprising:
a processor;
a graphical user interface, executed by the processor, configured to establish, for a user, a chat session for customer support service to an agent, wherein the user is among a plurality of users receiving customer support service via a plurality of chat sessions with one or more agents of a service provider, wherein the processor is further configured to transmit a user profile to a server to dynamically include in one or more communities that one or more of the plurality of users based upon corresponding user profiles and a context of customer support inquiries raised in the chat sessions, wherein the graphical user interface provides an option for the user to participate in the one or more communities of the plurality of users that are participating in at least one of the plurality of chat sessions, and displays representation of one or more applications specifically provided for the one or more communities, the one or more applications are enabled and available for the users when waiting for the agents during the chat sessions, and the one or more applications include a message board application displaying in the graphical user interface postings of at least the customer support inquiries during the chat sessions, during the waiting for the agents during the chat session, the graphical user interface displays a list of communities selected based on the context of customer support inquiries and the profiles of the plurality of users, wherein the list of communities includes the community and at least one external community over which the service provider has no control, in response to a search query transmitted during the chat sessions, the graphical user interface displays one or more answers determined within the postings, and the graphical user interface receives via the message board application an on-line auction service for the list of communities during the chat sessions.

20. An apparatus according to claim 19, wherein the graphical user interface is further configured either to share of information including a classified advertisement of the user with the other users of the one or more communities, or to receive service and product information, wherein the service and production information is associated with either the service provider or a third party.

21. An apparatus according to claim 19, wherein the processor is further configured to display on the graphical user interface the message board application and information of the created one or more communities at the user apparatus that is still participating in at least one of the plurality of chat sessions.

22. An apparatus according to claim 19, wherein traffic exchanged among the plurality of users of the one or more communities is monitored.

\* \* \* \* \*